Dec. 9, 1930.  C. A. CARBAUGH  1,784,175
ADJUSTING STOP FOR SAWMILL CARRIAGE HEADBLOCKS
Filed Aug. 6, 1929
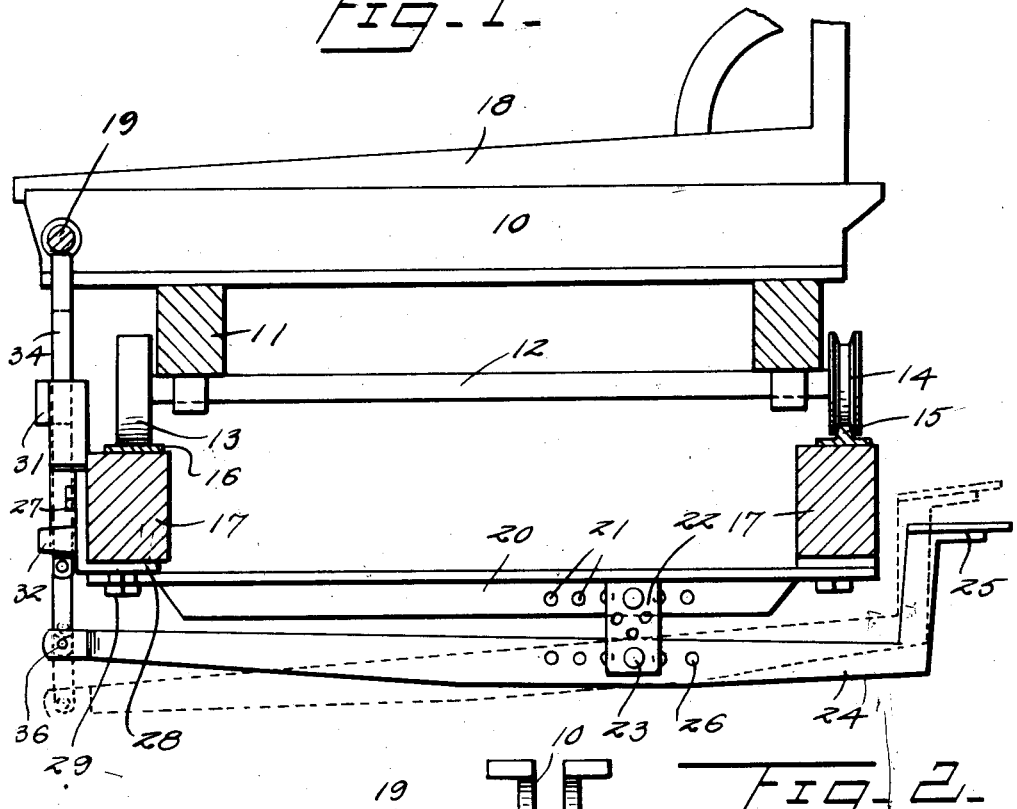
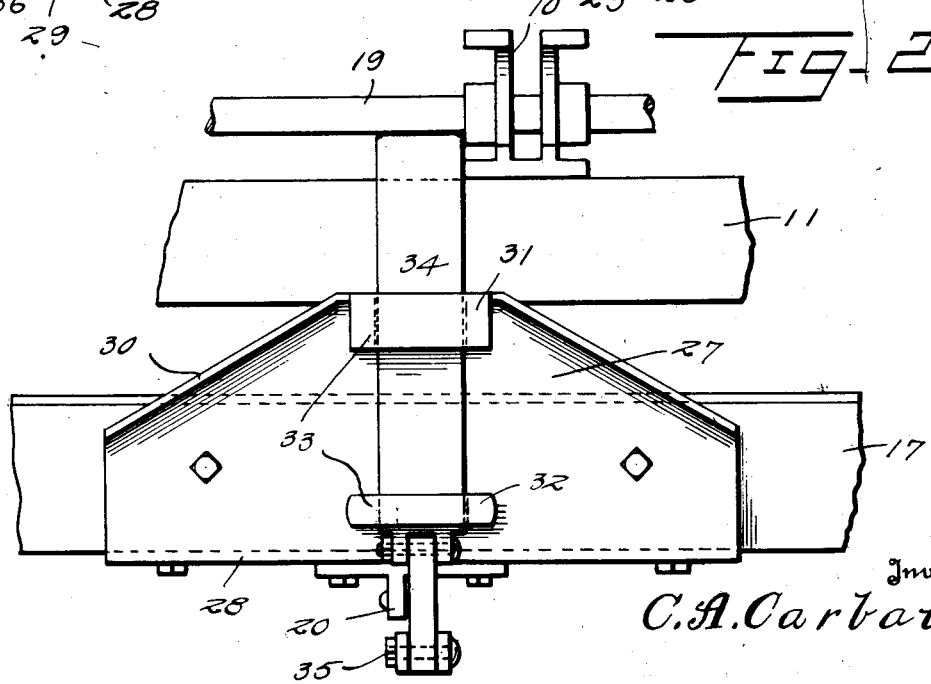
Inventor
C. A. Carbaugh
By Watson E. Coleman
Attorney Patented Dec. 9, 1930

1,784,175

UNITED STATES PATENT OFFICE

CONRAD A. CARBAUGH, OF DICKEYS MOUNTAIN, PENNSYLVANIA

ADJUSTING STOPS FOR SAWMILL CARRIAGE HEADBLOCKS

Application filed August 6, 1929. Serial No. 383,915.

This invention relates to devices for shifting logs on a saw mill carriage toward the saw for successive cuts and particularly to means whereby the head blocks upon which the log is supported may be shifted nearer to or further from each other. In all constructions of this character known to me, the head block is shifted by manually moving the head block along the guide rod and over the longitudinal beams of the carriage and then locking it in place.

The object of the present invention is to provide manually operable means whereby a stop may be projected into the path of movement of the head block as the carriage is moving longitudinally, thus holding the head block for movement with the carriage and, therefore, causing, as the carriage is moving, the distance between the held head block and the other head block to be varied so that the head blocks will either be relatively shifted nearer to or further from each other.

Other objects will appear in the course of the following description.

My invention is illustrated in the accompanying drawings, wherein:—

Figure 1 is a transverse section through a saw mill carriage and the supporting tracks and beams of the same and showing my stop in applied position;

Figure 2 is a fragmentary side elevation of the saw mill carriage, the track and the stop.

Referring to these drawings, 10 designates the head block of a saw mill carriage which rests upon the longitudinal rails or members 11 of the carriage which in turn support the axle 12 and the wheels 13 and 14. The wheel 14 is shown as a flanged wheel engaging a flanged rail 15 while the wheel 13 is a plain faced wheel engaging the flat rail 16. These rails rest upon the beams 17 of the carriage in the usual manner. Disposed upon the head block 10 is the knee 18 such as is commonly found in saw mill carriages and extending loosely through the head block is a guide rod 19 along which the head blocks move. So far I have illustrated an ordinary form of saw mill carriage and track therefor and it will be understood that this is illustrative of only one form of track and saw mill carriage and that my invention might be applied to other forms of saw mill carriage than that shown.

Connecting the beams 17 is a transverse member 20 having a plurality of apertures 21. This transverse member is bolted to the beams 17. Depending from the transverse member and bolted thereto through the bolt holes 21 is an ear 22 and pivoted to the lower end of this ear by a bolt 23 is a transverse lever 24 which extends beyond the beams 17 at its opposite ends and at one end is provided with a treadle 25. The bolt 23 may pass through any one of a plurality of openings 26 corresponding in number to the openings 21.

Mounted upon the beams 17 remote from the treadle 25 is a guide comprising a casting shown in Figure 1 and designated generally 27. This casting at its lower end has the inwardly extending flange 28 through which the bolt 29 passes.

The casting has inwardly extending upper edges each formed with an outwardly extending flange 30, these flanges intersecting at their upper ends a solid outwardly projecting portion 31. Projecting from the casting is a boss 32. The portion 31 and portion 32 are formed with rectangular openings 33 and sliding vertically through these openings is a vertically disposed stop 34. The lower end of this slide 34 is bifurcated and pivotally connected to a link 35 which at its lower end is connected to the forked end of the lever 24 by means of the bolt 36.

It will be understood, therefore, that when the lever 25 is depressed, the slide 34 will be shifted upward and constitute a stop projecting into the path of movement of the head block 10 as shown in Figure 2. The head block 10, therefore, cannot move toward the left in Figure 2 but is held from movement in this direction. Therefore, if the carriage be moved toward the left in Figure 2, it will carry with it one of the head blocks (not shown), but the head block 10 will be held from movement in this direction. If the slide or stop 34 be retracted or allowed to drop down, as it will under its own weight, the head block 10 will then move with the carriage. If it be desired to shorten the distance between the two head blocks, then the carriage is allowed to move for a short distance toward the left in Figure 2 sufficient to carry the head block 10 beyond the stop 34. Then the stop 34 is raised, and the carriage is moved in the reverse direction and, of course, this stops the movement of the head block 10, and the other head block, which is not shown, is brought up nearer the head block 10.

I have illustrated only one head block as provided with the stop 34. It will be understood that any one of the head blocks, however, may be provided with this stop and that if only one movable head block be provided, that particular head block may be held stationary when the carriage is moved in either direction to thus shorten or lengthen the distance between the head blocks.

The apertures 21 and 26 permit the supporting plate or lug 32 to be shifted nearer to or further from the treadle end of the lever 24 to thus change the leverage to shorten or lengthen the stroke. If the stop 34 be disposed, as shown, immediately beneath the rod 19, this rod will act as a limit stop, limiting the upward movement of the stop 34.

While I have illustrated a certain particular arrangement of parts, I do not wish to be limited thereto as it is obvious that this arrangement might be changed in many ways without departing from the spirit of the invention as defined in the appended claims.

I claim:—

1. The combination with a saw mill carriage having a head block, supporting wheels and a track structure with which the wheels engage, the head block being freely movable along the carriage but normally moving with the carriage, of means for stopping the movement of the head block with relation to the carriage comprising upwardly extending guides on the track structure, a lever extending transversely of and below the track structure and pivotally connected thereto for movement in a vertical plane, one end of the lever having a treadle, and a vertically sliding stop mounted in and extending through the guides thereof, the stop being operatively connected to the end of the lever opposite the treadle, a depression of the treadle acting to shift the stop upward into the path of movement of the head block.

2. The combination with a saw mill carriage having a head block, supporting wheels and a track structure with which the wheels engage, the head block being freely movable along the carriage but normally moving with the carriage, means for stopping the movement of the head block with relation to the carriage comprising a casting mounted upon the track structure and formed to provide a guide, a lever extending transversely of and below the track structure, one end of the lever having means whereby it may be operated, and a sliding stop mounted in said guide means for rectilineal movement into or out of the path of movement of the head block, and an operative connection between said lever and said stop whereby upon a depression of one end of the lever, the stop will be shifted upward rectilinearly and upon a release of the lever, the stop will be shifted downward rectilinearly.

3. Means for stopping the movement of a head block with relation to a saw mill carriage mounted upon a track structure comprising a casting adapted to be attached to the track structure and project above the same and formed to provide a guide, a stop rectilinearly movable through said guide and adapted when projected to be disposed in the path of movement of the head block or to be retracted out of said path of movement, a supporting member adapted to be attached beneath the track structure, and a lever pivotally supported upon the supporting member and beneath the same, the lever at one end being operatively connected to said stop and at its opposite end projecting beyond the track structure whereby it may be operated.

In testimony whereof I hereunto affix my signature.

CONRAD A. CARBAUGH.